(12) United States Patent
Yang et al.

(10) Patent No.: US 8,316,650 B2
(45) Date of Patent: Nov. 27, 2012

(54) SYSTEM AND METHOD FOR HEATING AND COOLING A VEHICLE

(75) Inventors: Jihui Yang, Lakeshore (CA); Mark W. Verbrugge, Troy, MI (US); Gregory A. Major, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 793 days.

(21) Appl. No.: 12/470,280

(22) Filed: May 21, 2009

(65) Prior Publication Data
US 2010/0294455 A1 Nov. 25, 2010

(51) Int. Cl.
*F25B 21/02* (2006.01)
(52) U.S. Cl. ............................ 62/3.61; 62/244
(58) Field of Classification Search .............. 62/3.5, 62/3.61, 235.1, 244; 165/42
See application file for complete search history.

(56) References Cited

U.S. PATENT DOCUMENTS

| | | | |
|---|---|---|---|
| 4,955,203 A | 9/1990 | Sundhar | |
| 6,158,225 A | 12/2000 | Muto et al. | |
| 6,662,572 B1 | 12/2003 | Howard | |
| 2006/0156738 A1 | 7/2006 | Khalil | |
| 2007/0214800 A1* | 9/2007 | Kadle et al. | 62/3.3 |
| 2008/0047277 A1 | 2/2008 | Kim | |

FOREIGN PATENT DOCUMENTS

| | | |
|---|---|---|
| CN | 2691931 | 4/2005 |
| DE | 29812875 | 12/1998 |
| DE | 19953465 | 12/2000 |
| DE | 10212561 | 9/2003 |
| DE | 102006038612 | 2/2008 |
| DE | 102006050637 | 3/2008 |
| GB | 2317445 | 3/1998 |
| JP | 11034647 | 2/1999 |
| JP | 11342731 | 12/1999 |
| JP | 2003/320843 | 11/2003 |

* cited by examiner

*Primary Examiner* — Melvin Jones
(74) *Attorney, Agent, or Firm* — Dierker & Associates, P.C.

(57) ABSTRACT

A system for heating and cooling a vehicle includes a solar panel disposed on a surface of a vehicle and a thermoelectric unit i) disposed on or in an internal surface disposed in a cabin area of the vehicle, and ii) operatively connected to the solar panel. The thermoelectric unit is configured to heat and/or cool the internal surface in response to electric current applied thereto from the solar panel. The system further includes a control unit operatively associated with the thermoelectric unit. The control unit is configured to determine the amount and direction of the electric current to be applied to the thermoelectric unit based on i) a measured ambient temperature, ii) a measured temperature of the internal surface, and iii) a user-preferred reference temperature.

20 Claims, 3 Drawing Sheets

SYSTEM AND METHOD FOR HEATING AND COOLING A VEHICLE

TECHNICAL FIELD

The present disclosure relates generally to systems and methods for heating and cooling a vehicle.

BACKGROUND

Various internal cabin surfaces of a motor vehicle such as, e.g., seats, arm rests, dashboards, etc. are often constructed from materials that tend to approach internal cabin temperatures over a period of time. For example, in instances where the vehicle is sitting in a parking lot on a hot and sunny day, the internal cabin surface may ultimately heat up to at least the temperature of the ambient environment. In another example, when the vehicle is sitting in a parking lot during an ice storm, the internal cabin surface may cool down to the temperature of the ambient environment.

SUMMARY

A heating and cooling system for a vehicle is disclosed herein. The system includes a solar panel operatively disposed on a surface of the vehicle and a thermoelectric unit i) operatively disposed on or in a seat disposed inside a cabin area of the vehicle, and ii) operatively connected to the solar panel. The thermoelectric unit is configured to heat and/or cool the seat in response to electric current applied thereto from the solar panel. The system further includes a control unit operatively associated with the thermoelectric unit. The control unit is configured to determine at least one of the amount and direction of the electric current to be applied to the thermoelectric unit based on i) a measured ambient temperature, ii) a measured temperature of the seat, and iii) a pre-selected reference temperature. A method for heating and cooling the vehicle is also disclosed herein.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Example(s) of the heating and cooling system for a vehicle, as disclosed herein, may advantageously be used to control the temperature of internal cabin surfaces of the vehicle (e.g., seats, arm rests, etc.) so that the temperature is substantially compliant to a vehicle passenger's comfort level. The heating and cooling system generally uses an electric current generated from a solar panel to operate at least one thermoelectric unit or module disposed in the internal cabin surface. In response to the electric current applied thereto from the solar panel, the thermoelectric unit(s) heat or cool the internal surface without i) having to draw the electric current from an in-vehicle battery, or ii) having to run an HVAC or other in-vehicle climate control system. Example(s) of the heating and cooling system also advantageously have substantially no effect on, or possibly reduce the fuel economy of the vehicle when the vehicle is operating. Additionally, the heating and cooling system disclosed herein, reduces compressor loads on the in-vehicle climate control system, as well as reduces battery power consumption during operation of the vehicle. Yet further, the heating and cooling system is controllable by the vehicle passenger or user.

The components of the system that are operatively connected to one another may be connected, for example, wirelessly and/or may be hard wired via a network or data bus in the vehicle.

Figure 1:
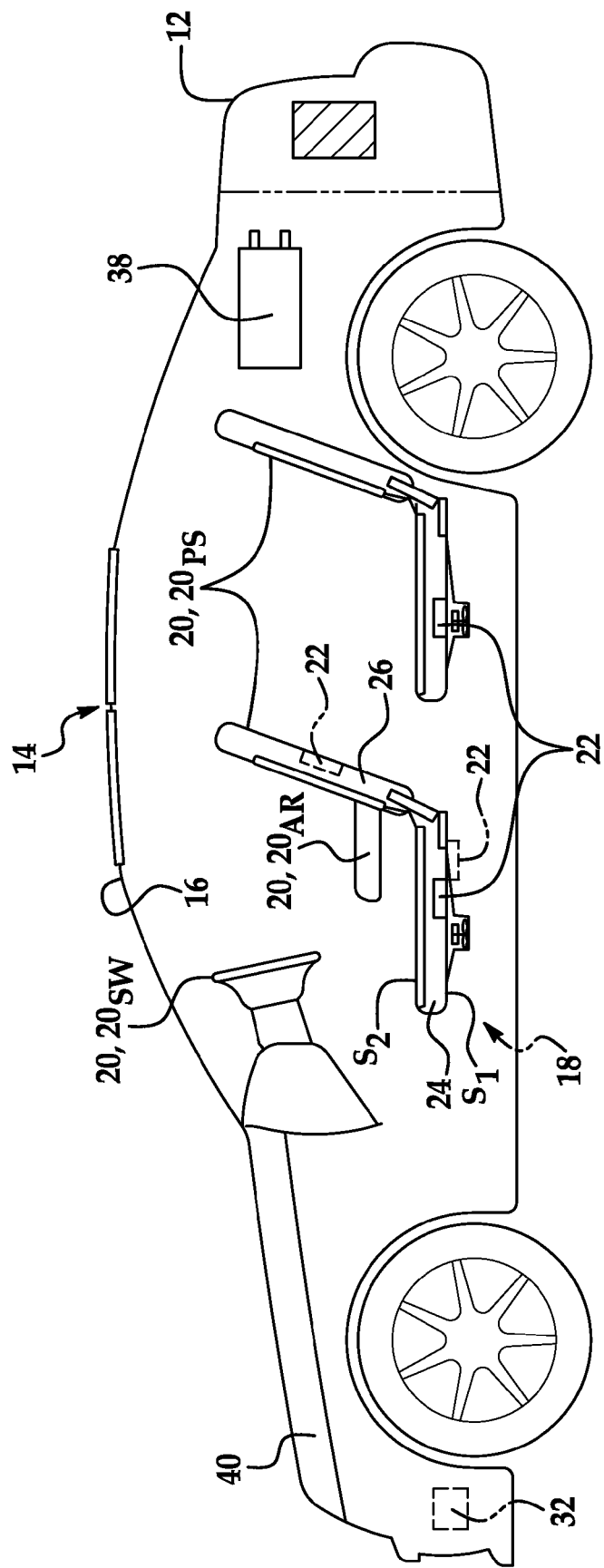
FIG. 1 semi-schematically depicts a vehicle including a heating and cooling system according to an embodiment disclosed herein.

In FIG. 1, some components of the heating and cooling system 10 (which is schematically shown in its entirety in FIG. 2) are shown disposed in a vehicle 12. The heating and cooling system 10 includes a solar panel 14 operatively disposed on a surface of the vehicle 12. In an embodiment, the solar panel 14 is disposed on any surface of the vehicle 12 that would provide the solar panel 14 sufficient exposure to sunlight. As shown in FIG. 1, the solar panel 14 may be disposed on the roof 16 of the vehicle 12. In a non-limiting example, the vehicle 12 may include a single solar panel 14. In another non-limiting example, the vehicle 12 may include more than one solar panel 14. In the later example, each of the solar panels 14 may be disposed on the same surface or on different surfaces of the vehicle 12.

The solar panel 14 is generally configured to be a source of electric energy for use in operating the heating and cooling system 10. The solar panel 14 may be selected from any solar device capable of supplying a suitable amount of electric energy to a thermoelectric unit 22 (which will be described in further detail below) operatively connected to the vehicle 12. In a non-limiting example, the solar panel 14 may have a maximum power density of about 100 W/m$^2$, and thus is capable of generating about 100 W of power on a sunny day. In an embodiment, the solar panel 14 is configured with its own control unit that is operatively connected and responds to signals and commands from the main system control unit 28 (shown and discussed further in reference to FIG. 2), thereby redirecting and/or adjusting electric flow. In another embodiment, the main system control unit 28 redirects and/or adjusts electric flow from the solar panel 14 to the thermoelectric unit(s) 22 (shown and discussed further hereinbelow in reference to all of the Figures), and as such, the solar panel does not include a separate control unit.

The vehicle 12 further includes an internal cabin area 18, in which various internal vehicle surfaces 20 are located. As used herein, the term "internal vehicle surface" refers to any surface located inside the internal cabin area 18 of the vehicle 12, where such surface 20 is in intimate contact with a vehicle 12 passenger for a time period. A non-limiting example of an internal vehicle surface 20 is a passenger seat $20_{PS}$. Other non-limiting examples of the internal vehicle surface 20 include a steering wheel $20_{SW}$, arm rests $20_{AR}$, interior surfaces of door panels (not shown), and/or other similar surfaces located inside the internal cabin area 18. A passenger seat $20_{PS}$ is used hereinbelow for purposes of describing the various examples and/or embodiments of the instant disclosure. It is to be understood, however, that such disclosure is not intended to be limited to passenger seats $20_{PS}$. It is further to be understood that it is assumed that one skilled in the art would be able to use other surfaces 20 in the heating and cooling system 10 disclosed herein by incorporating the teachings of the instant disclosure to such other surfaces 20.

Without being bound to any theory, it is believed that an air gap formed between the vehicle passenger and the vehicle surface 20 (i.e., resulting from indirect or non-intimate contact between the two) tends to provide a resistance to heat transfer between them. Intimate contact between the vehicle passenger or user and the vehicle surface 20, however, generally reduces the air gap and enables substantially direct thermal transfer from the heated or cooled surface 20 to the vehicle passenger. Less power and energy is typically required to operate the examples and embodiments of the heating and cooling system 10 disclosed herein due, at least in part, to the direct thermal transfer between the vehicle surface 20 and the vehicle passenger or user. In a non-limiting example, the examples and embodiments of the heating and cooling system 10 disclosed herein use less than 100 W of power to operate, whereas traditional HVAC systems often use between 5000 W and 9000 W of power.

In an embodiment, the internal surface 20 includes a base structure having a covering disposed thereover. For passenger seats $20_{PS}$, the base structure includes the seat structure having predetermined amounts of cushioning disposed thereover, and the covering formed over the cushioning. In an embodiment, the covering is formed from a base material selected from, e.g., various insulating materials. Non-limiting examples of suitable insulating materials include leather, various fabrics or cloths (e.g., cotton, wool, synthetic fabrics based on, e.g., nylon or other suitable polymers), vinyl, plastics, and/or the like, and/or combinations thereof. The base material may, in some instances, also include decorative additions such as, e.g., fine metal wires, buttons, fasteners, and/or the like. Although such insulating materials are generally sufficient for use in and contributing to the operation of the heating and cooling system 10, it may be desirable to increase the heat capacity of the seat $20_{PS}$ material so that the seat $20_{PS}$ material sufficiently maintains a user-preferred temperature over longer periods of time than insulating materials are able to provide. Accordingly, in an embodiment, one or more additional materials may be incorporated into the base material in order to modify the heat capacity. Non-limiting examples of suitable additional materials include phase-change materials that provide sufficient heat capacity such as, e.g., paraffin. The incorporation of the additional material(s) may be accomplished, for example, by using such additional material(s) as at least a part of the stitching/bonding material of the covering disposed on the base structure of the seat $20_{PS}$.

The heating and cooling system 10 further includes a thermoelectric unit 22 that is operatively disposed in or on any suitable region of the internal vehicle surface 20 such that the thermoelectric unit 22 is in physical (intimate) contact with at least a portion of the vehicle passenger's body. In an embodiment, the thermoelectric (TE) unit 22 is operatively disposed on or in the internal surface 20. For example, the thermoelectric unit 22 may be embedded in any region of the surface 20 in contact with the vehicle passenger such as, e.g., inside a seat region 24 of the passenger seat $20_{PS}$ (this TE unit 22 is shown in solid lines in FIG. 1) or in a lumbar region 26 of the passenger seat $20_{PS}$ (this TE unit 22 is shown in phantom lines in FIG. 1). In another example, the thermoelectric unit 22 (also shown in phantom lines in FIG. 1) may be disposed on the seat region 24 of the passenger seat $20_{PS}$ on a side $S_1$ opposed to the side $S_2$ upon which the passenger sits. In an example, a thermoelectric unit 22 having a flexible mount may be used, at least in regions of the vehicle surface 20 where the vehicle passenger sits, leans, rests, or the like (such as, e.g., on a surface of the passenger seat $20_{PS}$ upon which the vehicle passenger sits). It is to be understood that the thermoelectric unit 22 may be placed in or on other regions of the passenger seat $20_{PS}$, which are not necessarily depicted in the examples shown in FIG. 1.

Additionally, the heating and cooling system 10 may include a single thermoelectric unit 22, or may include a plurality of thermoelectric units 22. In instances where a plurality of thermoelectric units 22 is used, the thermoelectric units 22 may be disposed adjacent to each other, or in different portions of the internal vehicle surface 20. In an example (as shown in FIG. 1), one thermoelectric unit 22 may be embedded in the seat region 24, another thermoelectric unit 22 may be disposed on the seat region 24, and yet another thermoelectric unit 22 may be disposed in the lumbar region 26.

The thermoelectric unit 22 is also operatively connected to the solar panel 14 and is configured to receive an electric current therefrom. The thermoelectric unit 22 may be any suitable solid-state device that uses the Peltier effect to heat and cool the internal surface 20 in response to the electric current applied to the unit 22 from the solar panel 14. In a non-limiting example, the amount of electric current sufficient to heat and/or cool the vehicle surface 20 ranges from about 0.1 Amps to about 100 Amps.

Figure 2:
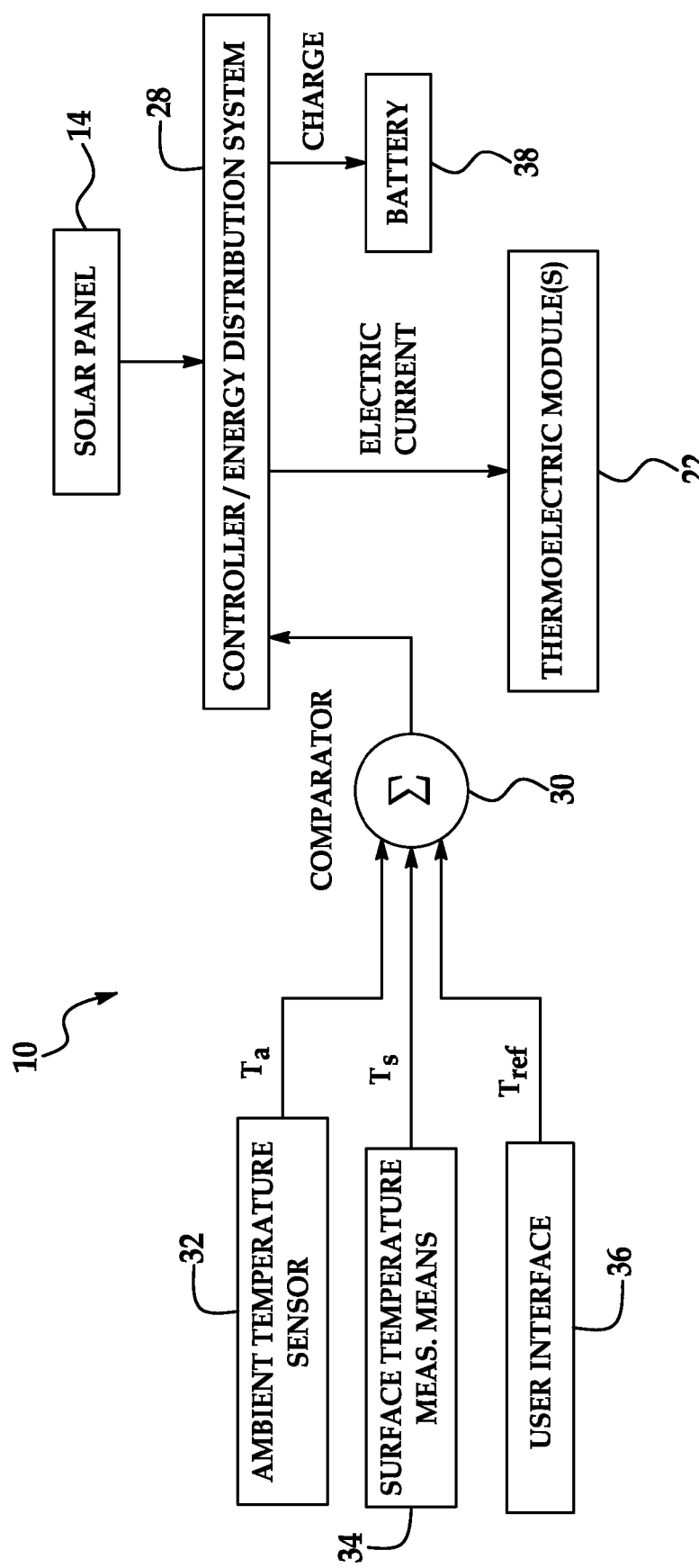
FIG. 2 is a flow diagram depicting an example of an operation of an embodiment of a heating and cooling system.

Referring now to FIG. 2, the heating and cooling system 10 is generally controlled by a control unit 28, which is operatively associated with the thermoelectric unit 22 and with the solar panel 14. More specifically, the application of the electric current (e.g., the amount applied and the direction in which it is applied) to the thermoelectric unit 22 and, thus, the ultimate heating and cooling of the vehicle 12 (the method of which will be described in detail below) is controlled by the control unit 28. In an example, the control unit 28 may be any suitable processing device having a memory associated therewith, and may be configured to run one or more software programs for controlling the heating and cooling system 10. The control unit 28 may, in some instances, be operatively connected to a comparator 30 (shown in FIG. 2), which is any suitable computational device that may be used alone or in combination with the control unit 28 to determine the amount and direction of the electric current to be applied to the thermoelectric unit 22. In a non-limiting example, the comparator 30 may otherwise be incorporated in the control unit 28, whereby the control unit 28 alone would function as both a processing device and a computational device.

The heating and cooling system 10 further includes an ambient temperature sensor 32 that is configured to measure the ambient temperature $T_a$ proximate to the vehicle 12. For example, the ambient temperature sensor 32 may be an inlet air temperature sensor (also shown in dotted lines in FIG. 1), which is placed under the hood 40 of the vehicle 12, adjacent to a radiator (not shown). It is to be understood that the ambient temperature sensor 32 may otherwise be placed in other suitable locations. Furthermore, other temperature sensors 32 may also be used in the vehicle 12 such as, e.g., an internal cabin temperature sensor or the like (not shown in the Figures).

The system 10 further includes means 34 for measuring the temperature $T_s$ of the internal surface 20. Non-limiting examples of such means 34 include at least one sensor disposed in or on the internal surface 20, at least one probe disposed in or on the internal surface 20, an infrared scanner configured to scan the internal surface 20, or combinations thereof. In instances where an infrared scanner is used, the scanner may be mounted in a headliner, incorporated inside a rear view mirror, and/or the like. The ambient temperature sensor 32 and the means 34 for measuring the temperature $T_s$ of the surface 20 are both in operative communication with the control unit 28, or with the comparator 30 and the control unit 28 in instances where the comparator 30 and the control unit 28 are separate devices (as shown in FIG. 2).

The heating and cooling system 10 further includes a user interface 36 (which is in operative communication with the control unit 28, or with the control unit 28 and the comparator 30), or another suitable device enabling a vehicle passenger or user to select or otherwise input a preferred reference temperature $T_{ref}$ for the interior surface 20 and/or the cabin area 18. As used herein, the term "reference temperature $T_{ref}$" refers to a user-preferred temperature of the vehicle surface 20 and/or the cabin area 18. As will be described further below, the reference temperature $T_{ref}$ may be used, by the comparator 30 and/or the control unit 28, in determining the amount and direction of electric current to be applied to the thermoelectric unit 22 in order to heat and cool at least the internal surface 20.

In an example, the heating and control system 10 may be operatively connected to a vehicle battery 38. The vehicle battery 38 generally supplies electric energy to various operating systems of the vehicle 12 including, e.g., a vehicle ignition system, a vehicle lighting system, a vehicle computer system, etc. In instances where the solar panel 14 does not produce enough electric energy to operate the thermoelectric unit 22, the heating and cooling system 10 may draw the deficient energy from the battery 38. In other instances where the solar panel 14 produces more than enough electric energy to operate the thermoelectric unit 22, the excess energy unused by the thermoelectric unit 22 may be distributed to the battery 38.

The heating and cooling system 10 has been described hereinabove for heating and cooling the internal surface 20 (e.g., the passenger seat $20_{PS}$). It is to be understood that the system 10 is further configured to heat and cool the cabin area 18 of the vehicle 12 as a result of the heating and cooling of the internal surface 20. For example, a cooling of the passenger seat $20_{PS}$ would, over time, also cool the internal cabin area 18 to some degree, where such cooling is based, at least in part, on heat transfer principles. It is further to be understood that the heating and cooling of the internal cabin area 18 as a result of the heating and cooling of the internal surface 20 occurs by natural convection. Thus, a fan or other air distribution device may not be required for the heating and cooling of the cabin area 18. It is to be understood, however, that a fan may still be incorporated into the heating and cooling system 10 even if one is not required.

Figure 3:
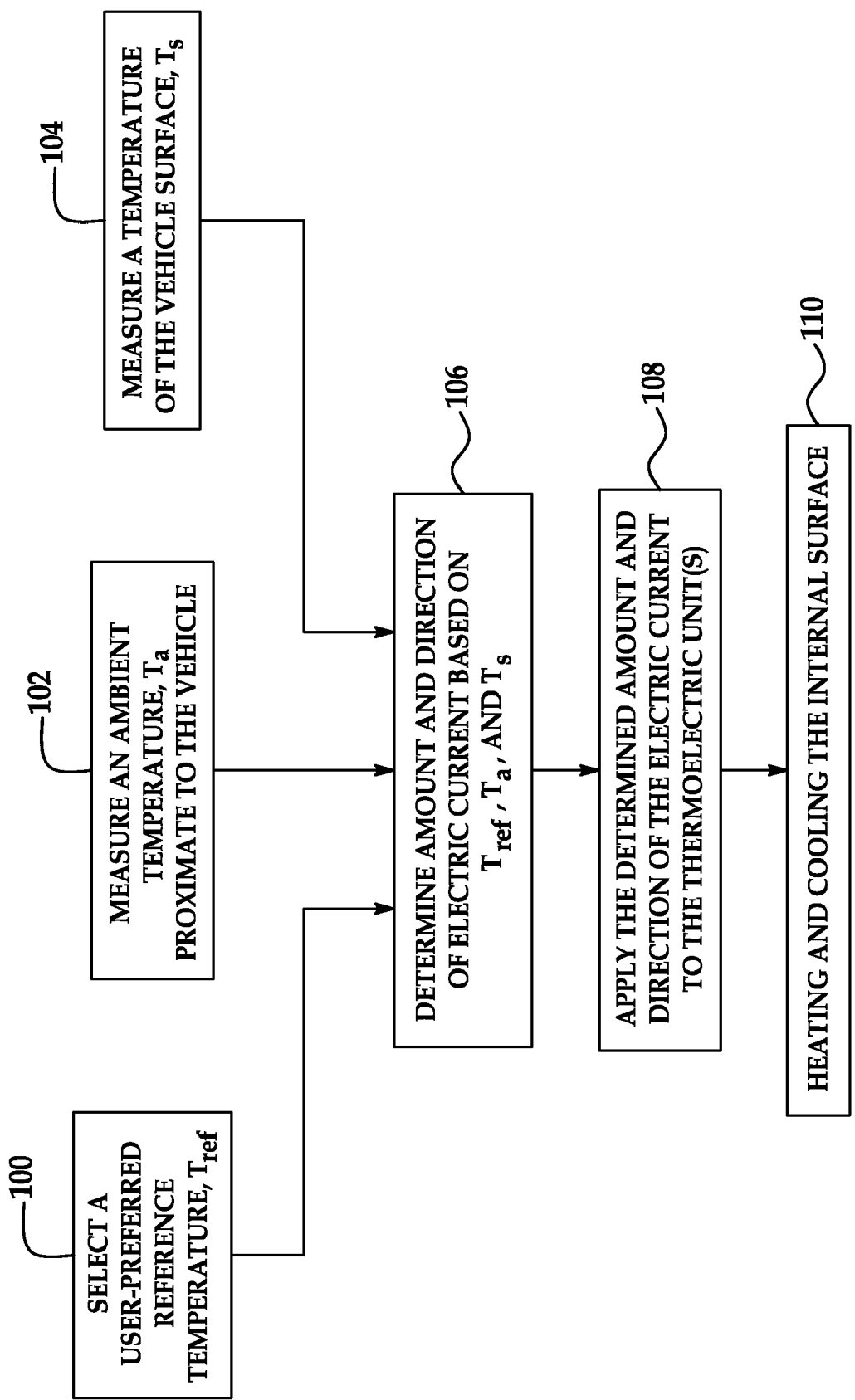
FIG. 3 is a flow diagram depicting a method of heating or cooling a vehicle.

The method of heating and cooling the vehicle 12 using the system 10 will now be described herein in conjunction with FIGS. 2 and 3. Referring first to FIG. 3, the method includes selecting a user-preferred reference temperature $T_{ref}$ for the internal surface 20 and/or the cabin area 18 (as shown by reference numeral 100), measuring an ambient temperature $T_a$ proximate the vehicle 12 (as shown by reference numeral 102), measuring a temperature $T_s$ of the vehicle surface 20 (as shown by reference numeral 104), determining the amount and direction of the electric current based on the selected user-preferred reference temperature $T_{ref}$, the measured ambient temperature $T_a$, and the measured temperature $T_s$ of the internal surface 20 (as shown by reference numeral 106), and applying the determined amount and/or direction of the electric current to the thermoelectric unit(s) 22 to heat or cool the internal surface 20 (as shown by reference numeral 108).

Referring back to FIG. 2, the selecting of the user-preferred reference temperature $T_{ref}$ is accomplished by the user. To reiterate from above, such user-preferred reference temperature $T_{ref}$ is the user's (e.g., the vehicle passenger's) selected and/or desired temperature for the internal surface 20 and/or for the cabin area 18 of the vehicle 12. The selection of the reference temperature $T_{ref}$ may be accomplished by the user inputting the reference temperature $T_{ref}$ using, e.g., the user interface 36. The step of inputting the reference temperature $T_{ref}$ may include, e.g., selecting the temperature $T_{ref}$ from a list of temperatures provide to the user on the user interface 36 display screen, typing the reference temperature $T_{ref}$ into the user interface 36 using, e.g., a keypad or a touch screen, vocally reciting the reference temperature $T_{ref}$ into a microphone operatively associated with the user interface 36, or via other suitable inputting means.

The ambient temperature $T_a$ proximate the vehicle 12 may be measured using the temperature sensor 32, and transmitting the measured $T_a$ directly into the comparator 30, or into the control unit 28 if a separate comparator 30 is not used. Likewise, the temperature of the internal surface $20\,T_s$ may be measured using the measuring means 34 (e.g., sensor(s), probe(s), infrared scanner, etc.), and such temperature $T_s$ measurement is transmitted into the comparator 30 and/or the control unit 28. In instances where a comparator 30 is used, the comparator 30 compares the ambient temperature $T_a$ and the measured temperature $T_s$ of the surface 20. In an embodiment, the comparing of the ambient temperature $T_a$ and the temperature $T_s$ may be accomplished by taking an average of the two temperatures $T_a$, $T_s$.

In an embodiment, the comparator 30 and/or the control unit 28 may also include suitable logic circuitry which enables the comparator 30 and/or the control unit 28 to be adaptable to varying situations and/or conditions. An example of such a situation may include when one or more vehicle surfaces 20 is/are exposed to different levels of hot/cold temperatures. For instance, if the vehicle 12 is sitting in a parking lot on a hot, sunny day, the vehicle 12 may be positioned such that the passenger seat $20_{PS}$ on the driver side is exposed to more sunlight than the passenger seat $20_{PS}$ on the passenger side. In this instance, the comparator 30 (or the control unit 28 in instances where a separate comparator 30 is not used) weights the surface temperature $T_{s,DS}$ of the driver side seat $20_{PS}$ more (e.g., in terms of percentage) than the surface temperature $T_{s,PS}$ of the passenger side seat $20_{PS}$. Accordingly, a larger electric current may be applied to the thermoelectric unit 22 disposed in the driver side seat $20_{PS}$ than to the passenger side seat $20_{PS}$ until the desirable temperature is achieved.

In some cases, the comparator 30 and/or the control unit 28 may further be configured to monitor the exposure of the sunlight to one or more of the vehicle surfaces 20 in the event that such exposure changes. Changes to the exposure to the sunlight may occur, for example, by repositioning the vehicle 12 in the parking lot so that the sunlight is now directed to one or more other surfaces 20 (e.g., as opposed to the previously mentioned passenger seat $20_{PS}$). Changes in the exposure of the sunlight may also occur, for example, as the sun moves across the sky, causing the angle at which the sunlight is directed on the vehicle 12 to change over time. When such changes occur, the control unit 28 may also be configured to send an updated command to the solar panel 14, which, in this example may include to i) decrease the amount of current applied to the thermoelectric unit 22 disposed in the driver side seat $20_{PS}$, and ii) increase the amount of current applied to the thermoelectric unit 22 disposed in the passenger side seat $20_{PS}$.

In another embodiment, the comparator 30 and/or the control unit 28 may be configured to accommodate user preferences for specific surfaces 20 in the cabin area 18. For example, if a passenger has a back injury, the passenger may set the control unit 28 so that the lumbar region 26 of the passenger seat $20_{PS}$ is always warmer than, e.g., the seat region 24 of the seat $20_{PS}$. In some instances, the passenger may actually set the lumbar region 26 to a pre-selected temperature. In the foregoing embodiment, a thermoelectric unit 22 may be disposed in or on the seat region 24 and another thermoelectric unit 22 may be disposed in or on the lumbar region 26, where each thermoelectric unit 22 is independently controllable to accommodate such differing temperatures between the seat region 24 and the lumbar region 26.

In yet another embodiment, the control unit 28 may be configured to command the solar panel 14 to apply a suitable amount of electric current to the different regions of the surface 20 (such as, e.g., at least regions 24, 26 of the passenger seat $20_{PS}$) based, at least in part, on the heat capacity of varying parts of the passenger's body. For instance, the heat capacity of the passenger's thigh may be higher than, e.g., the heat capacity of the passenger's neck. The amount of current applied to the seat region 24 and the lumbar region 26 of the seat $20_{PS}$ may by independently adjusted accordingly.

For such embodiments described immediately above, the comparator 30 and/or the control unit 28 use each surface temperature $T_s$ independently to determine the amount of electric current to be applied to the respective surfaces 20. In an example, each surface temperature $T_s$ is compared with the ambient temperature $T_a$ by taking an average of the temperatures.

In some instances, it may be desirable to apply substantially the same amount of electric current to all of the surfaces 20, regardless of the fact that one or more of the surfaces 20 may be hotter or colder than another one or more of the surfaces 20 (such as when the driver side seat $20_{PS}$ is exposed to more sunlight than the passenger side seat $20_{PS}$). In such instances, the comparator 30 weights the surface temperature $T_s$ of the different surfaces 20 according to a predetermined percentage. The predetermined percentage may be based, at least in part, on the amount of energy required (determined from the surface temperature measurements) to heat/cool the specific surface 30 (e.g., the surface 20 exposed to the sunlight) relative to another surface 20 (e.g., the surface exposed to the shade). Then, an average is taken of i) the weighted measurements, and ii) the ambient temperature $T_a$.

The compared temperatures $T_a$, $T_s$ are then used to determine a temperature difference between the compared temperatures and the user-preferred reference temperature $T_{ref}$. This temperature difference generally corresponds to the amount and direction of the electric current to be applied to the thermoelectric unit 22 and may be used to alter such amount and direction supplied to the thermoelectric unit 22 by the solar panel 14. For example, the amount of electric current or energy is generally proportional to the temperature difference, and such correlation may be programmed into the control unit 28 as, e.g., a mathematical equation represented by the equation $$I = X \times \left( \frac{T_{ref} + (T_S - T_{ref})}{T_{ref}} \right),$$

where I is the electric current, X is a scaling factor, $T_S$ is the temperature of the surface 20, and $T_{ref}$ is the reference temperature. Accordingly, upon determining the temperature difference, the control unit 28 correlates the temperature difference with the electric current and sends a command to the solar panel 14 to apply the correlated current to the appropriate thermoelectric unit 22.

The direction of the electric current is generally based on whether the surface 20 will be heated or cooled. In an example, if the temperature difference produces a negative number, a first polarity of current may be applied to the thermoelectric unit in order to heat the surface 20. However, if the temperature difference produces a positive number, the polarity of the electric current switches (i.e., the direction switches), where such current is applied to the thermoelectric unit 22 in order to cool the surface 20.

The control unit 28 thereafter sends a command to the solar panel 14 to apply the determined amount and direction of electric current to the thermoelectric unit 22 to heat and cool the surface 20 (see reference numerals 108 and 110 in FIG. 3). During the application of the electric current to the thermoelectric unit 22, the temperature measuring means 34 of the surface 20 substantially continuously measures the temperature of the surface 20. Such continuous temperature measurements are inputted into the comparator 30, where the comparator 30 compares the measured temperature of the surface 20 $T_s$ with the user-preferred reference temperature $T_{ref}$ until the temperature $T_s$ reaches the reference temperature $T_{ref}$ value. At this point, the control unit 28 sends a command to the solar panel 14 to stop applying the electric current to the thermoelectric unit 22. At the same time, the control unit 28 also sends a command to the solar panel 14 to distribute any remaining electric current to the vehicle battery 38 for recharging the battery 38 in instances where the battery 38 is not completely charged (i.e., the battery voltage is not above a maximum voltage that reflects a complete charging of the battery 38).

In an embodiment, if the temperature difference between i) the compared temperatures, and ii) the reference temperature $T_{ref}$ exceeds a predetermined threshold, the control unit 28 may further be configured to send a command to the solar panel 14 to direct all of the electric current to the thermoelectric unit 22. However, in instances where the temperature difference is below another predetermined threshold, the control unit 28 may additionally be configured to send a command to the solar panel 14 to direct all of the electric current to the battery 38. In instances where the temperature difference falls between the two thresholds, the electric current may be distributed between the thermoelectric unit 22 and the battery 38. As such, the control unit 28 is generally adaptable to accommodate the comfort level of the vehicle passenger based, at least in part, on the user-preferred reference temperature $T_{ref}$.

In still a further embodiment, the control unit 28 may be configured to determine when an internal vehicle surface 20 is actually in contact with the passenger's body. For example, the heating and cooling system 10 may include additional sensors, where appropriate, that will signal the control unit 28 when the passenger seat $20_{PS}$ is being occupied. Once the control unit 28 is notified of the occupancy of the seat $20_{PS}$, the control unit 28 commands the solar panel 14 to apply the appropriate amount and direction of electric current to the thermoelectric unit 22 associated with that particular seat $20_{PS}$. In some instances, the control unit 28 may also be configured to command the solar panel 14 to apply the electric current according to a pre-set time interval (e.g., every half hour, every hour, etc.) until the user-preferred reference temperature $T_{ref}$ has been reached so long as the vehicle ignition is running.

Although the instant disclosure has been described above for use in a motor vehicle, it is to be understood that such disclosure may also be applied in other applications. For instance, the various examples and embodiments of the system and method disclosed herein may be applied in aerospace applications, nautical applications, buildings or other land structures, etc. It is further to be understood that the various examples and embodiments of the heating and cooling system 10 may be used in combination with another climate control system (e.g., a refrigerant based air conditioning system, or the like). In some instances, the heating and cooling system 10, alone, may be sufficient for heating and cooling the vehicle 12 and, thus, another climate control system may not be required.

While several embodiments have been described in detail, it will be apparent to those skilled in the art that the disclosed embodiments may be modified. Therefore, the foregoing description is to be considered exemplary rather than limiting.

The invention claimed is:

1. A heating and cooling system for a vehicle, the system comprising:
a solar panel operatively disposed on a surface of the vehicle;
a thermoelectric unit i) operatively disposed on or in an internal surface disposed inside a cabin area of the vehicle, and ii) operatively connected to the solar panel, the thermoelectric unit configured to at least one of heat or cool the internal surface in response to electric current applied thereto from the solar panel; and
a control unit operatively associated with the thermoelectric unit, the control unit including computer readable code, embedded on a non-transitory, tangible computer readable medium, for determining the amount and direction of the electric current to be applied to the thermoelectric unit by the solar panel, the computer readable code for the determining including:
computer readable code for comparing a measured ambient temperature with a measured temperature of the internal surface; and
computer readable code for determining a temperature difference between the compared temperatures and a user-preferred reference temperature, the temperature difference corresponding to the amount and direction of the electric current to be applied to the thermoelectric unit.

2. The heating and cooling system as defined in claim 1 wherein the internal surface is a seat, and wherein the thermoelectric unit is embedded inside the seat.

3. The heating and cooling system as defined in claim 1 wherein the internal surface is a seat, and wherein the thermoelectric unit is disposed in or on a lumbar region of the seat.

4. A heating and cooling system for a vehicle, the system comprising:
a solar panel operatively disposed on a surface of the vehicle;
a thermoelectric unit i) operatively disposed on or in an internal surface disposed inside a cabin area of the vehicle, and ii) operatively connected to the solar panel, the thermoelectric unit configured to at least one of heat or cool the internal surface in response to electric current applied thereto from the solar panel; and
a control unit operatively associated with the thermoelectric unit, the control unit configured to determine at least one of the amount and direction of the electric current to be applied to the thermoelectric unit based on i) a measured ambient temperature, ii) a measured temperature of the internal surface, and iii) a user-preferred reference temperature;
an ambient temperature sensor in operative communication with the control unit, the sensor configured to measure the ambient temperature; and
means for measuring the temperature of the internal surface, the means being in operative communication with the control unit.

5. The heating and cooling system as defined in claim 4 wherein the means for measuring the temperature of the internal surface is selected from at least one sensor disposed in or on the internal surface, at least one probe disposed in or on the internal surface, an infrared scanner configured to scan the internal surface, and combinations thereof.

6. The heating and cooling system as defined in claim 1 wherein the internal surface includes a base material and at least one other material configured to enhance the heat capacity of the internal surface.

7. The heating and cooling system as defined in claim 1 wherein the vehicle further includes a battery, and wherein the control unit is further configured to distribute electric energy un-used by the thermoelectric unit to the battery.

8. The heating and cooling system as defined in claim 1 wherein the pre-selected reference temperature is a vehicle user-selected temperature.

9. The heating and cooling system as defined in claim 1 wherein the system is further configured to heat and cool the cabin area as a result of the heating and cooling of the internal surface.

10. A method of heating and cooling a vehicle, the vehicle including a cabin area having at least one internal surface disposed therein, the method comprising:
selecting a user-preferred reference temperature for the internal surface, the cabin area, or combinations thereof;
measuring an ambient temperature proximate the vehicle;
measuring a temperature of the at least one internal surface;
determining, based on i) the measured ambient temperature, ii) the measured temperature of the internal surface, and iii) the selected user-preferred reference temperature, an amount and direction of electric current, generated from a solar panel, to be applied to a thermoelectric unit disposed in or on the at least one internal surface; and
applying the determined amount and direction of the electric current to the thermoelectric unit to heat or cool the internal surface.

11. The method as defined in claim 10 wherein the determining of the amount and direction of the electric current includes:
comparing the measured ambient temperature with the measured temperature of the internal surface; and
determining a temperature difference between the compared temperatures and the user-preferred reference temperature, the temperature difference corresponding to the amount and direction of the electric current to be applied to the thermoelectric unit.

12. The method as defined in claim 11 wherein the comparing of the measured ambient temperature and the measured temperature of the internal surface includes taking an average of the measured ambient temperature and the measured temperature of the internal surface.

13. The method as defined in claim 10, further comprising:
measuring a temperature of at least one other internal surface, the at least one other internal surface having a thermoelectric unit disposed therein or thereon;
weighting the respective temperatures of the at least one internal surface and the at least one other internal surface;
taking an average of the weighted temperatures;

comparing the measured ambient temperature with the averaged weighted temperature; and determining a temperature difference between the compared temperatures and the user-preferred reference temperature, the temperature difference corresponding to an amount and direction of the electric current to be applied to the thermoelectric unit of the at least one surface and the at least one other surface.

14. The method as defined in claim 10, further comprising:

measuring a temperature of at least one other internal surface, the at least one other internal surface having an other thermoelectric unit disposed therein or thereon;

taking an average of i) the ambient temperature and the temperature of the at least one internal surface, and ii) the ambient temperature and a temperature of the at least one other internal surface;

determining a temperature difference between i) the averaged temperature of the ambient temperature and the temperature of the at least one internal surface, and ii) the user-preferred reference temperature, the temperature difference corresponding to an amount and direction of a first electric current to be applied to the thermoelectric unit; and determining a temperature difference between i) the averaged temperature of the ambient temperature and the temperature of the at least one other internal surface, and ii) the user-preferred reference temperature, the temperature difference corresponding to an amount and direction of a second electric current to be applied to the other thermoelectric unit of the at least one surface and the at least one other surface.

15. The method as defined in claim 14, further comprising:

applying the first electric current to the thermoelectric unit disposed in or on the at least one internal surface; and applying the second electric current to the other thermoelectric unit disposed in or on the at least one other internal surface.

16. The method as defined in claim 10, further comprising heating or cooling the internal surface until the measured temperature of the internal surface reaches the selected user-preferred reference temperature.

17. The method as defined in claim 16 wherein when the measured temperature of the internal surface reaches the selected user-preferred reference temperature, the method further comprises:

stopping the applying of the electric current to the thermoelectric unit; and distributing the electric current to a battery operatively disposed in the vehicle.

18. The method as defined in claim 10, further comprising heating or cooling the cabin area as a result of the heating or cooling of the internal surface.

19. The method as defined in claim 18 wherein the heating and cooling of the cabin area is accomplished via natural convection.

20. The method as defined in claim 10 wherein the internal surface is a seat.

* * * * *